J. M. ATKINSON.
Combined Sleeve and Clamp for Repairing Water-Mains.
No. 219,339. Patented Sept. 9, 1879.
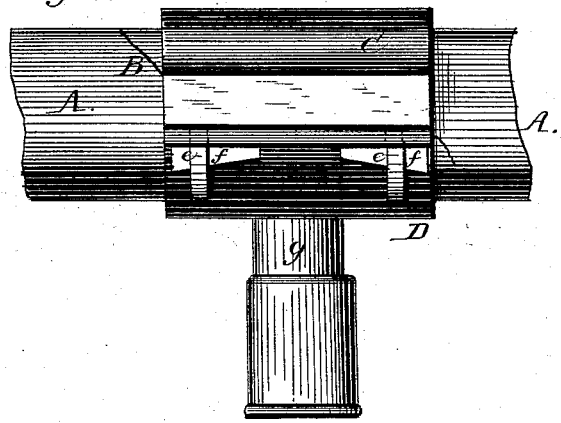
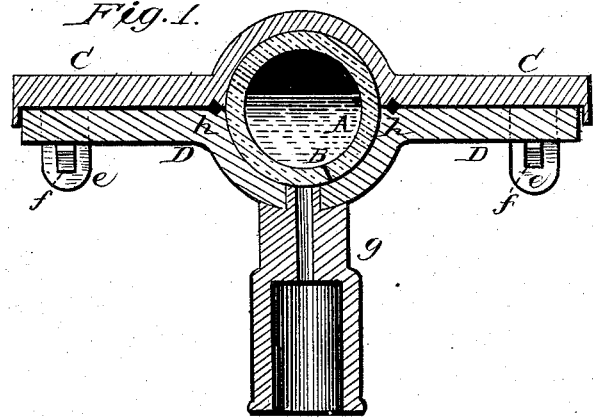
Witnesses
Fred G. Dietrich
Jno. P. Brooks.
Inventor
James M. Atkinson
by A. C. Johnston
Attorney

UNITED STATES PATENT OFFICE.

JAMES M. ATKINSON, OF PITTSBURG, PENNSYLVANIA, ASSIGNOR OF ONE HALF HIS RIGHT TO EVAN JONES, OF SAME PLACE.

IMPROVEMENT IN COMBINED SLEEVE AND CLAMP FOR REPAIRING WATER-MAINS.

Specification forming part of Letters Patent No. 219,339, dated September 9, 1879; application filed July 26, 1879.

*To all whom it may concern:*

Be it known that I, JAMES M. ATKINSON, of Pittsburg, in the county of Allegheny and State of Pennsylvania, have invented a new and useful Improvement in Sleeve and Clamp Combined for Repairing Water-Mains; and I do hereby declare that the following is a full and exact description thereof, reference being had to the accompanying drawings, and to the letters of reference marked thereon.

My invention relates to an improvement in detachable sleeve and clamp combined for water-mains; and consists of two parts clamped together by means of lugs and wedges, one of said parts being provided with a connecting branch.

To enable others skilled in the art to make and use my invention, I will proceed to describe its construction and operation.

In the accompanying drawings, which form part of my specification, Figure 1 is a vertical and longitudinal section of my improvement. Fig. 2 is an end elevation, representing the clamp and sleeve combined, secured in position on a section of pipe.

Water-mains are frequently burst by undue pressure, and leaks frequently occur in such pipes from imperfections in them.

The object of my invention is to provide a simple and efficient means for repairing such pipes when cracked and leaky. For this purpose I construct a clamp and sleeve combined, one part of which is provided with a branch, so that connections may be made with the water-main, notwithstanding it may be cracked and leaky where it is desirable to make a connection.

In the drawings, A represents a water-main, representing a crack in it, (indicated at B.) C represents one portion of the sleeve or clamp, which is provided with four lugs, e, in which are slots. D represents the other part of the clamp, which is provided with four apertures, corresponding in position to the position of the lugs on the part C. The two parts are held together by means of wedges f, driven in the slots of the lugs e.

The part D has a projecting branch, g, for the purpose of making connections with the water-main.

Near the inner wall of the clamp, at the union of the two parts, are grooves h, for the reception of a packing metal or other suitable material.

When desirable, a strip of sheet-lead may be placed around the water-main and the two parts of the clamp placed over it, and when the two parts are properly secured together the lead may be calked.

The advantage of my improvement consists in providing an efficient means for repairing water-mains with facility and without the necessity of cutting off the water-supply and separating the pipes for the purpose of inserting a new section. These, with other advantages, will be apparent to plumbers and others engaged in laying or repairing water-mains.

Having thus described my improvement, what I claim is—

1. A clamp and sleeve combined for the repair of water-mains, consisting of the part C, provided with slotted lugs e, and the part D, provided with openings for the lugs e, said parts being held together by means of the wedges f, and provided with groove h, for the reception of a packing material, substantially as herein described, and for the purpose set forth.

2. A clamp and sleeve combined for the repair of water-mains, consisting of the part C, provided with slotted lugs e, and the part D, provided with openings for the lugs e, said parts being held together by means of the wedges f, and provided with a branch, g, substantially as herein described, and for the purpose set forth.

JAMES M. ATKINSON.

Witnesses:
　A. C. JOHNSTON,
　JAMES J. JOHNSTON.